United States Patent
Puglia et al.

[19]

[11] Patent Number: 6,074,718

[45] Date of Patent: *Jun. 13, 2000

[54] SELF SUPPORTING HOLLOW FIBER MEMBRANE AND METHOD OF CONSTRUCTION

[75] Inventors: John P. Puglia, Pepperell; David F. McKinley, Melrose, both of Mass.

[73] Assignee: Koch Membrane Systems, Inc., Wilmington, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/597,609

[22] Filed: Feb. 6, 1996

[51] Int. Cl.$^7$ .............................. B32B 1/08; B01D 39/00
[52] U.S. Cl. ..................... 428/36.5; 210/500.23; 210/500.35; 210/500.42; 428/373; 428/398
[58] Field of Search .................. 210/500.23, 500.27, 210/500.35, 500.42; 428/36.5, 304.4, 373, 398

[56] References Cited

U.S. PATENT DOCUMENTS

| | | |
|---|---|---|
| 3,615,024 | 10/1971 | Michaels . |
| 3,642,668 | 2/1972 | Bailey et al. . |
| 4,203,848 | 5/1980 | Grandine, II . |
| 4,288,494 | 9/1981 | Porter et al. . |
| 4,377,481 | 3/1983 | Jakabhazy ............................ 210/500.2 |
| 4,612,119 | 9/1986 | Eguchi . |
| 4,613,441 | 9/1986 | Kohno et al. ....................... 210/500.36 |
| 4,666,991 | 5/1987 | Matsui et al. ........................... 525/276 |
| 4,919,809 | 4/1990 | Yamamoto et al. . |
| 4,968,733 | 11/1990 | Muller et al. . |
| 5,028,337 | 7/1991 | Linder et al. ............................ 210/642 |
| 5,387,378 | 2/1995 | Pintauro et al. ........................... 264/48 |

FOREIGN PATENT DOCUMENTS

| | | |
|---|---|---|
| 0 378 441 A2 | 7/1990 | European Pat. Off. . |
| 0 682 977 A2 | 11/1995 | European Pat. Off. . |
| 90224407 | 6/1990 | WIPO . |
| WO 93/22034 | 11/1993 | WIPO . |

OTHER PUBLICATIONS

Patent Abstracts of Japan, vol. 013, No. 122 (M–807), Mar. 27, 1989 & JP 63 296940 A (Toray Ind Inc), Dec. 5, 1988.
Patent Abstracts of Japan, vol. 097, No. 003, Mar. 31, 1997 & JP 08–299770 A (NOK Corp).

*Primary Examiner*—Blaine Copenheaver
*Attorney, Agent, or Firm*—Shook, Hardy & Bacon L.L.P.

[57] ABSTRACT

A method for constructing a polyvinylidene fluoride based hollow fiber membrane from a polymer mixture using temperatures not greater than 80° C., the mixture comprising polyvinylidene fluoride, a pore forming agent, and a solvent. The mixture can also comprise a second polymer selected from the group comprising polymethylmethacrylate, polyvinylformal, polyvinyl alcohol, polyhexafluoropropylene, polydiacetylene, cellulose and copolymers thereof. The hollow fiber membranes formed using the controlled temperatures of this invention have acceptable strength characteristics and asymmetrical pore structures which provide a low transmembrane pressure drop.

8 Claims, 1 Drawing Sheet

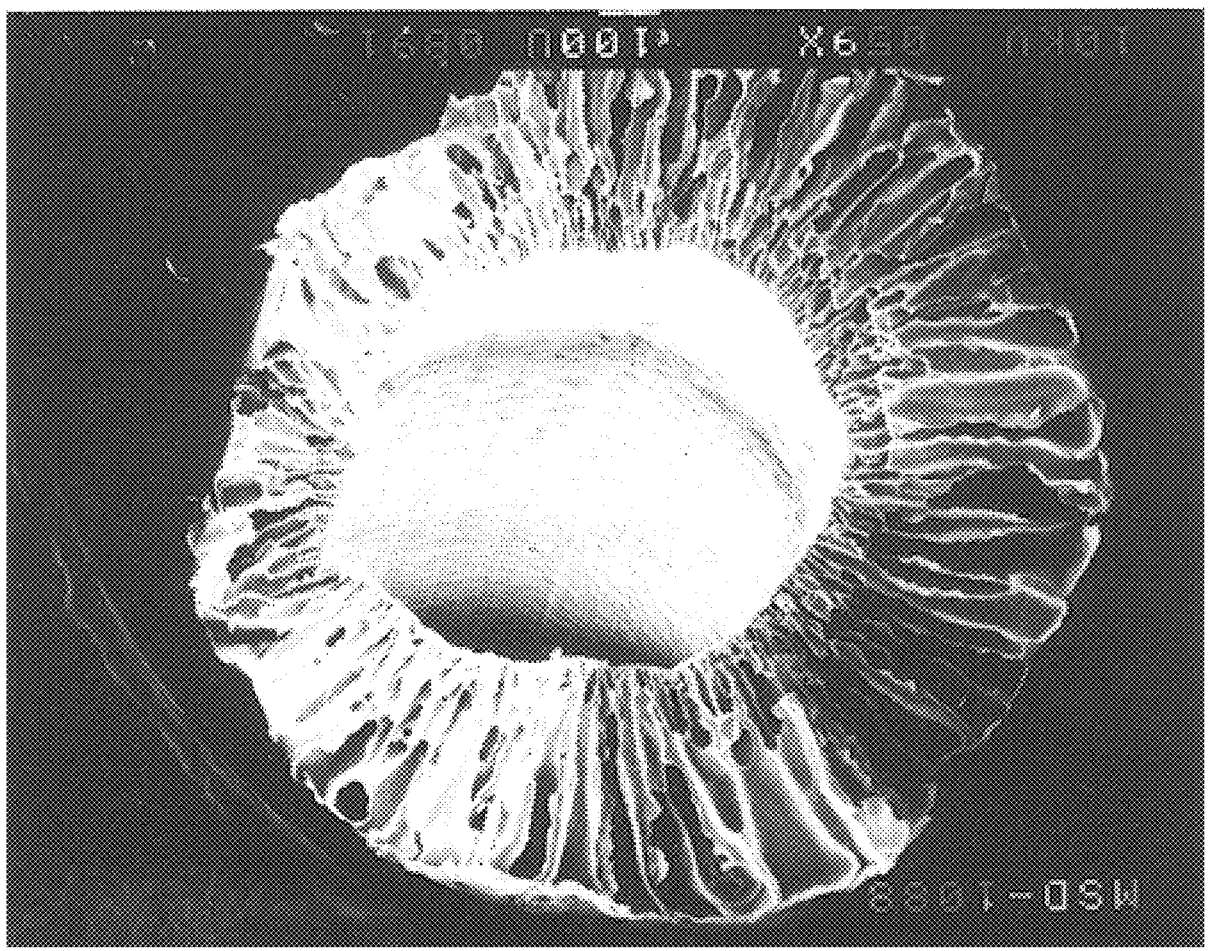

SELF SUPPORTING HOLLOW FIBER MEMBRANE AND METHOD OF CONSTRUCTION

BACKGROUND OF THE INVENTION

The present invention relates in general to filtration devices and, more particularly, to hollow fiber membranes and a method of construction thereof.

Membranes are linings or partitions which are able to divide or separate two phases, e.g., a liquid phase from a gas phase, a solid from a liquid, or multiple components of a liquid from each other. These membranes are typically formed from polymers and are semipermeable, allowing a transfer between the phases which are to be separated. The specific physical shape or form of the membranes can vary, and can include flat sheets, tubular membranes, and hollow fibers. The specific use to which the membrane is to be put dictates the form selected for its construction. Membranes in the form of hollow fibers are currently used in a variety of applications, including dialysis, gas separation, ultrafiltration, microfiltration, and nanofiltration.

In forming hollow fiber membranes, the polymer chosen for the membrane is processed, initially, into one of two different types of fiber forming materials. The polymer is either dissolved in a suitable solvent to form a polymer solution, or heated to form a polymer melt. The properties of the particular polymer used, as well as the properties of the desired end product, allow one skilled in the art to determine whether the fiber forming material selected for a particular application will be a polymer solution or a polymer melt. When polymer solutions are utilized, the phase inversion from a liquid phase to a solid phase can be achieved in one of several different ways, including evaporation of the solvent, precipitation of the polymer, cooling of the solution to solidify the polymer, or use of a non-solvent to remove the solvent from the solution. On the other hand, when polymer melts are utilized, the phase inversion is generally thermally induced.

Once the selected polymer is processed into the desired fiber forming material for constructing a hollow fiber membrane, i.e., a polymer solution or a polymer melt, the material is extruded through the annular opening of a spinneret, generally the tube-in-orifice type, to form a hollow core extrudate. Internal bore fluids are often co-extruded within the hollow fiber membrane to form the bore or lumen of the hollow fiber. When the fiber forming material to be processed is a polymer melt, the extruded fiber is solidified by means of a thermally generated phase inversion. This phase inversion is induced by the relatively cool temperature of a coagulation bath into which the hollow fiber is passed subsequent to extrusion, as compared to the temperature of the polymer melt at the time of extrusion, or by the relatively cool temperature of the bore fluid or of the air contacted by the extruded fiber prior to its submersion in a coagulation bath. When the fiber forming material to be processed is a polymer solution, phase inversion can be achieved by evaporating the solvent, leaving the polymer membrane in its final form. If the solvent is not sufficiently volatile, it may be necessary to pass the extruded fiber through a bath containing a non-solvent, which will remove the solvent from the polymer solution, precipitating the polymer in its final form as a hollow fiber membrane.

One of the polymers useful in the production of these hollow fiber membranes is polyvinylidene fluoride, commonly referred to as PVDF. The use of PVDF and other polymers in the production of hollow fibers is described in great detail in U.S. Pat. No. 4,958,733. According to the teachings of this patent, PVDF is processed into a fiber forming material by heating it to about 185° C. to form a polymer melt, and then extruding the melt through a spinneret. An internal bore fluid is co-extruded in the lumen of the fiber, helping to solidify and form the inner core of the hollow fiber membrane. This extruded hollow fiber is then passed through a water bath, having a temperature of about 20° C., where it is allowed to cool and further solidify the membrane. Formation of a hollow fiber membrane according to this patent is thus triggered by a thermally induced phase inversion.

Prior to the present invention, attempts to construct PVDF hollow fiber membranes from polymer solutions were unsuccessful, as the membranes thus formed had insufficient strength to retain the hollow fiber form or to withstand the rigors of the filtration process. In order to construct hollow fiber membranes from PVDF which were strong enough to function adequately, the conventional practice was to increase the concentration of the PVDF in the solution. However, to achieve adequate strength characteristics, the PVDF concentration had to be increased to a point at which it was necessary to heat the polymer in order to put it into solution, effectively turning the solution into a polymer melt. However, the processing of PVDF into a polymer melt and the subsequent thermally induced phase inversion associated with polymer melts tended to compromise certain characteristics of the end product membrane formed.

Thus, while PVDF hollow fiber membranes formed from conventional polymer solutions might have sufficient strength for use as membrane sheets or other types of membranes which have backing elements associated therewith, they lacked the necessary strength to function adequately as hollow fiber membranes which generally do not incorporate backings for imparting additional strength thereto. The fiber itself must possess sufficient rigidity and strength to withstand the rigors of ultrafiltration and other end uses. Therefore, PVDF hollow fiber membranes formed from polymer solutions have not heretofore been commercially desirable.

While PVDF hollow fiber membranes constructed from polymer melts might have sufficient strength to stand alone as hollow fiber membranes, the resultant porosity achieved was not commercially acceptable. The reason for this decreased porosity is thought to be that as the polymer is melted, all gases and voids within it are expelled, maximizing the polymer density. When the melt undergoes phase inversion subsequent to spinning, the resultant fiber membrane has a density at least equal to or greater than that of the starting polymer material. This increased density translates to decreased porosity, a drawback in the membrane industry. Additionally, PVDF membranes formed from polymer melts have primarily symmetrical pore structures, another potentially undesirable feature of hollow fiber membranes.

In addition to these deficiencies found in the prior art, it was previously thought that the size of the pores in the membranes was primarily dependent upon the amount of pore forming agent included in the polymer solution or polymer melt. However, increasing the amount of pore former to provide the desired porosity often resulted in membranes having pores which were too large, with the resultant membrane being too weak to provide effective filtration.

SUMMARY OF THE INVENTION

It is an object of this invention to provide polyvinylidene fluoride based hollow fiber membranes having enhanced strength characteristics, including increased burst pressure resistance and improved tensile strength.

It is also an object of this invention to provide a method of constructing polyvinylidene fluoride based hollow fiber membranes which does not require thermally induced phase inversion, so that the membrane formed has improved strength and increased porosity characteristics.

It is a further object of this invention to provide a method of constructing polyvinylidene fluoride based hollow fiber membranes whereby the membrane is constructed from a fiber forming material comprising a polyvinylidene fluoride polymer solution, so that the polyvinylidene fluoride is not subjected to elevated temperatures with decreased porosity and diminished strength characteristics.

It is another object of the present invention to provide a method of constructing polyvinylidene fluoride based hollow fiber membranes wherein the rate of the phase inversion is controlled, at least in part, by utilizing a bore fluid and/or a coagulation bath, one or both of which may comprise at least a portion of the solvent present in the polymer solution.

It is a still further object of the present invention to provide a method of constructing polyvinylidene fluoride based hollow fiber membranes wherein the membrane pore size can be regulated, at least in part, by controlling the solvent content in the coagulation bath and/or in the bore fluid, so that decreased quantities of pore forming agent are required than previously deemed effective.

It is an additional object of the present invention to provide a polyvinylidene fluoride based hollow fiber membrane produced in accordance with the method of this invention having an asymmetrical pore structure, so that a low transmembrane pressure drop can be achieved by use of the membrane.

To accomplish these and other related objects of the invention, in one aspect the invention is a method for constructing a semipermeable hollow fiber membrane, comprising the steps of preparing a fiber forming material by contacting and mixing, at a temperature between about 4° and 80° C., polyvinylidene fluoride, a pore forming agent, and a solvent capable of solubilizing the polyvinylidene fluoride, to form a homogeneous mixture; maintaining the mixture at a temperature ranging from about 4° to about 80° C. during the mixing; extruding the mixture through a spinneret to form a hollow fiber; and removing the solvent and pore forming agent from the mixture to form a semipermeable hollow fiber membrane having an asymmetrical pore structure.

In another aspect, the invention is related to a semipermeable polyvinylidene fluoride based hollow fiber membrane constructed from a polymer mixture in accordance with the method as set forth above, and having an asymmetrical pore structure.

PVDF based hollow fiber membranes constructed according to the method of the present invention can be formed from a polymer mixture without utilizing thermally induced phase inversion techniques. In contrast to this phase inversion associated with polymer melts, the phase inversion of polymer solutions results in a membrane having a density less than or equal to the density of the starting polymer material. This decreased density translates to increased porosity in the hollow fiber membrane. Using the method of the present invention, PVDF based hollow fiber membranes can be constructed possessing enhanced strength characteristics, thus creating a useful and commercially acceptable PVDF based hollow fiber membrane product. Additionally, the membrane formed in accordance with the method of this invention has an asymmetrical pore structure, adding to the efficiency and desirability of the membrane.

BRIEF DESCRIPTION OF THE DRAWINGS

The FIGURE shows a scanning electron micrograph of the cross-section of a membrane produced according to the method of this invention.

DESCRIPTION OF THE PREFERRED EMBODIMENT

According to the present invention, a polyvinylidene fluoride, or PVDF, hollow fiber membrane is constructed from a PVDF based polymer mixture which is processed using known spinneret technology. This mixture can be of any suitable form, including a solution or a suspension having solids dispersed uniformly throughout. In one embodiment, the selected form of the polymer mixture is a solution, which is initially prepared by combining PVDF with a solvent and a pore forming agent. The preferred PVDF used in this invention has a molecular weight (MW) of about 100,000 to 10,000,000, and a melt flow index between 5 and 10 at 21.6 kg weight. The quantity of PVDF in the polymer solution can range from about 5% to about 48% by weight. In a preferred embodiment, the solution contains from about 30% to about 35% by weight PVDF.

There are many acceptable solvents which can be used in the solution of this invention, and can be either protic or aprotic. Suitable solvents are those which are capable of solubilizing the PVDF, and are also capable of solubilizing the pore forming agent, although it is not necessary for the pore forming agent and the PVDF to have the same solubility. The solvents can comprise dimethylacetamide, N-methyl pyrole, cyclohexane and acetone, or mixtures of two or more thereof. Of course, other solvents capable of solubilizing the PVDF are also useful in this invention. It will be apparent to one skilled in the art that the selection of the appropriate solvent, as well as the concentration of the solvent, will be one factor in determining the characteristics, including pore size, of the end product membrane. The solvent comprises from about 45% to 80% by weight of the solution. In a preferred embodiment, the polymer solution contains from about 60% to about 70% by weight solvent.

The pore forming agent included in the solution is selected primarily on the basis of the desired pore size or pore size distribution to be achieved in the end product hollow fiber membrane. As discussed above, in the solution of this embodiment of the present invention, the pore forming agent must be soluble in the solvent. A wide range of suitable pore forming agents are useful in the present invention, broadly including halide salts and low molecular weight moieties, with examples of suitable pore forming agents found to be particularly useful in the present invention including lithium chloride, maleic anhydride, polyvinyl pyrilodone having a MW of about 15,000 to 500,000, methylmethacrylate, n-dodecane, and carbonates. One skilled in the art will recognize that there are a large variety of other pore forming agents acceptable for use in this invention. According to the present invention, the polymer solution contains from about 1% to about 25% by weight of the pore forming agent, depending primarily on the pore sizes to be formed. In a preferred embodiment, the amount of pore forming agent ranges from about 1% to about 10% by weight.

As stated previously, the pore forming agent acts essentially as a space filler within the polymer mixture, and is leached out of the extruded fiber during the coagulation process. After the agent is diffused through the walls of the extruded fiber, the pockets or areas previously occupied by the pore forming agent become the pores within the membrane. The speed of the diffusion is one of the variable factors used to determine the ultimate size and size distribution of the pores. For example, a slower rate of diffusion provides the membrane with additional time to solidify around the agent before it is completely removed, thereby forming more controlled pore sizes than when the agent is more rapidly diffused. The desired rate of diffusion can be selected by varying a number of factors known to one skilled in the art. According to the process of the present invention, one such factor is the addition of solvent to the bore fluid and/or the coagulation bath, as is set forth in more detail below. The pore sizes achieved by the method of the present invention can, for example, range from about 0.003 to about 1 micron in diameter, with the preferred pore sizes ranging from about 0.01 to about 1 micron in diameter. As is discussed in more detail below, these factors help to create membranes having asymmetrical pore structures.

In addition to assisting in the pore formation of the membrane, the pore forming agent also helps to process the PVDF into the polymer solution or other mixture. Specifically, the addition of the pore forming agent allows higher concentrations of PVDF to go into the homogeneous or uniform polymer mixture without the use of the elevated temperatures of the conventional methods, thereby creating polymer mixtures with sufficiently high concentrations of PVDF to form hollow fiber PVDF membranes having acceptable strength characteristics.

According to another embodiment of this invention, the PVDF is combined with a second, complementary polymer in a solution similar to that discussed above, although other suitable mixtures may also be useful. Such a polymer blend has not been previously used for the construction of hollow fiber membranes. Polymers which are acceptable for use with this embodiment include many of the semicrystalline polymers commonly known as engineering thermoplastic resins. Examples of such suitable polymers include, but are not limited to, polymethylmethacrylate (MW=5,000 to 10,000,000), polyvinylformal (MW=5,000 to 1,000,000), polyvinyl alcohol (MW=50,000 to 20,000,000), polyhexafluoropropylene (MW=100,000 to 10,000,000), polydiacetylene (MW=1,000 to 1,000,000), cellulose (MW=10,000 to 1,000,000) and copolymers of these polymers. One skilled in the art will recognize that a wide range of characteristics and properties of the end product membrane can be achieved through appropriate selection of the second polymer which is to be blended with the PVDF.

When combined with this second polymer, the polymer solution of this embodiment contains from about 5% to about 48% by weight of polyvinylidene fluoride, and in a preferred embodiment, the solution contains about 30%–35% by weight of PVDF. The second polymer is present in an amount of about 1%–35% by weight, depending on the specific complementary polymer selected and the desired properties of the end product membrane, and in a preferred embodiment, the solution contains about 10–15% by weight of the second polymer. In a preferred embodiment, the total of the combined polymers in the solution ranges from about 25–45% by weight, with a concentration of 35–40% being particularly preferred. As is well understood, the specific combinations and quantities of polymers, pore forming agents and solvents can achieve a vast array of hollow fiber membranes having differing properties.

In preparing the polymer mixture of the present invention, the pore forming agent is first mixed into the solvent until it is totally dispersed therein. Under high or low shear conditions, the PVDF and the second polymer, if utilized, are then added and mixed into the mixture. The temperature of the mixture is maintained in a range between about 4° C. and 80° C., and preferably should not be higher than about 60° C. Care should be taken to assure that the temperature of the polymer mixture is never raised above 80° C. The mixing is continued for approximately 2 to 3 hours, after which time the mixture is covered and allowed to totally degas.

Subsequent to degassing, the polymer mixture is introduced into a conventional spinning apparatus, or spinneret, such as a tube-in-orifice type spinneret which produces a hollow fiber extrudate. This spinneret has an inner chamber communicating with the outer portion of the spinneret housing, the chamber having a hollow tube secured therein. The fiber forming mixture to be spun from the spinneret is supplied to the nozzle block, or annular space defined by the outer wall of the tube and the inner wall of the chamber. The lumen of the hollow tube generally carries a bore fluid which is co-extruded with the fiber forming material. According to the method of the present invention, the polymer mixture as defined herein is delivered to the nozzle block of the spinneret, with the temperature of the mixture as it is extruded being maintained in a range from about 4° C. to 60° C., and preferably not greater than 50° C. The bore fluid is then delivered to the hollow tube positioned therein. The fiber forming mixture is extruded through the annular space described above to form a hollow core extrudate, and the bore fluid is co-extruded therewith from the hollow tube of the spinneret.

The bore fluid generally comprises water, and preferably comprises a mixture of water and a portion of the same solvent initially used as the solvent in the polymer mixture. The function of the bore fluid is to assist in the formation of the fibers from the inside out, whereby the inner wall of the fiber begins to coagulate as it comes into contact with the bore fluid. The solvent which is present in the bore fluid slows the coagulation process by preventing what might otherwise be essentially instantaneous coagulation. In addition, as the bore fluid passes through the lumen of the fiber, it also dissolves some of the pore forming agent and removes it from the polymer mixture, thereby assisting in the creation of the pores. It is recognized that the concentration of the solvent in the bore fluid is generally much less than in the polymer mixture. For example, the solvent/water ratio in the bore fluid can range from about 50/50 (wt/wt) to about 0/100 (wt/wt). The end use of the fiber and the desired porosity typically determines the solvent/water ratio selected. For microfiltration purposes, the solvent/water ratio of the bore fluid can range from about 50/50 (wt/wt) to about 30/70 (wt/wt), producing pores ranging from about 0.2 to about 1.0 microns, whereas for ultrafiltration, the ratio of the bore fluid can range from about 20/80 (wt/wt) to about 0/100 (wt/wt), producing pore sizes from about 0.005 to about 0.10 microns. For nanofiltration uses, where pore sizes can be as small as 0.003 microns, it is generally desirable not to add any solvent to the bore fluid.

The polymer mixture and the bore fluid are co-extruded through the spinneret as described above, and the hollow fiber thus formed is spun into a gravity-fed coagulation bath where the formation of the membrane is ultimately completed. In certain circumstances, it may be desirable for the extruded fiber to pass through the air for a predetermined distance before entry into the coagulation bath, although it can also be extruded directly into the bath. When it is desired that the fiber contact the air prior to entry into the coagulation bath, the appropriate distance between the nozzle of the spinneret and the surface of the bath is determined by the time and distance necessary for the bore fluid to begin permeating from the lumen of the fiber through the outer wall thereof, which permeation should occur prior to entry of the fiber into the bath.

As with the bore fluid, the fluid in the coagulation bath generally comprises water, and preferably comprises a mixture of water and a portion of the same solvent used in the polymer mixture. Generally, the solvent/water ratio for the coagulation bath is essentially the same as for the bore fluid, as described above, ranging from about 50/50 (wt/wt) to about 0/100 (wt/wt), depending upon the criteria discussed above. The preferred temperature of the coagulation bath and the bore fluid ranges from about 4° C. to about 50° C. The following table shows the membrane pore sizes formed from the various solvent/water ratios of the coagulation bath and the bore fluid (all wt/wt), and includes the type of filtration associated with the particular membrane formed.

| Solvent/Water | Membrane Type | Membrane Pore Size |
| --- | --- | --- |
| 50/50 | Microfiltration | 1.0 micron |
| 40/60 | Microfiltration | 0.5 microns |
| 30/70 | Microfiltration | 0.2 microns |
| 20/80 | Ultrafiltration | 0.1 microns |
| 10/90 | Ultrafiltration | 0.05 microns |
| 5/95 | Ultrafiltration | 0.01 microns |
| 0/100 | Ultrafiltration | 0.005 microns |
| 0/100 @ −10° C. | Nanofiltration | 0.003 microns |

The pore sizes can be measured by any of a number of conventional methods. One such method utilizes molecular weight markers, whereby beads having selected diameters are passed through the membrane, and the percentage of beads which pass through is recorded.

The addition of solvent to the bore fluid and the coagulation bath in accordance with the present invention slows the rate of the phase inversion as set forth below, thereby creating a structurally enhanced membrane having an asymmetrical pore structure. In general, as the fiber forming material is extruded, the polymer begins to solidify. The solvent present in the bore fluid and in the coagulation bath tends to slow down this process, providing more time for the polymer to solidify around the pore forming agent and thereby controlling the pore creation as the agent is slowly leached from the fiber. Thus, the more solvent present in the bore fluid and the coagulation bath, the slower the rate of the phase inversion of the extruded fiber, and consequently the more controlled the pore size of the end product membrane. Additionally, as the extruded fiber coagulates, the pore forming agent goes into solution with the bore fluid and the coagulation bath, leaving the pores behind. Altering the quantity of solvent in these fluids is an important factor in varying the resultant membrane pore size. Importantly, as the utilization of varying quantities of the solvent can achieve a wide range of pore sizes in the membrane, a smaller amount of pore forming agent can be employed in the polymer mixture than was previously deemed practical. It has also been determined that hollow fiber membranes formed according to the method of this invention have increased strength characteristics and porosity, thought to be attributable at least in part to the slowed rate of phase inversion, as well as the controlled temperature of the polymer mixture as it is being formed and spun. More particularly, the pore volume associated with membranes formed by the method of this invention is preferably in the range of about 25% to 60%, and more preferably, the pore volume is about 50%.

Subsequent to the coagulation bath, the fibers are leached for a period of approximately 24 hours in a water bath in order to remove all of the remaining solvent from the fibers. After leaching, the fibers are placed in a glycerin and water bath for a period of approximately 24 hours, with the quantity of glycerin in the glycerin/water bath ranging from about 0% to about 75%. The glycerin acts as a membrane pore radius-maintaining agent by filling the pores of the finished membrane to prevent them from collapsing during storage prior to use in a filtering device. The fibers are then dried in a 50° C. oven for a suitable period of time, preferably 12 to 48 hours, after which time the fibers are stored and ready for use.

The asymmetrical pore structures of the membranes formed in accordance with the method of this invention can be clearly seen in the FIGURE, which is a scanning electron micrograph of the cross-section of a hollow fiber membrane made in accordance with the present invention. As can be seen from the micrograph, the outer skin layer of the fiber and the inner skin layer of the bore contain small holes therein, which are in communication with the pores within the fiber body. The cross-sectional view clearly shows that the pores begin at these small outer holes in the skin layers and become significantly wider throughout the cross-section of the membrane. This asymmetrical pore structure facilitates a low transmembrane pressure drop, which is advantageous in the filtration process. Specifically, once a liquid particle enters an asymmetrical pore from the outer layer of a membrane, it is quickly passed through the width of that membrane, requiring little pressure to complete its transfer therethrough. By contrast, when a membrane is processed from a polymer melt and the phase inversion is thermally induced, the pores which are formed are generally symmetrical, having essentially the same diameter at the outer layer of the membrane and throughout the cross-section of the membrane. Thus, when a liquid enters the symmetrical pores of the membrane from the outer layer, pressure is required to force the liquid through the membrane.

As is known in the industry, fibers spun using a spinneret such as is described above can have wall thicknesses and outer diameters according to the specifications of the spinneret utilized. According to the present invention, the hollow fiber wall thickness can be widely varied, and is preferably in the range of about 5 to about 15 mils. The outer diameter measurement can also vary widely, and preferably ranges from about 10 to about 750 mils. It is understood that these values can easily be varied to achieve the desired properties of the end product membrane.

PVDF hollow fiber membranes formed in this manner are found to have enhanced strength and porosity properties and desirable asymmetrical pore structures, as compared to the prior art PVDF membranes formed using polymer melt processes and thermally induced phase inversion. The following are examples of methods of constructing PVDF based membranes in accordance with the present invention. All percents are by weight unless otherwise noted.

EXAMPLE 1

A polymer solution was formed by mixing 1% lithium chloride (LiCl) into 69% N,N-dimethylacetamide (DMAC) until totally dispersed. Under shear, 30% PVDF (MW=10,000 to 100,000,000 g/mole) was mixed into the solution. Mixing continued for 2 to 3 hours with the solution being maintained at a temperature of between 70 and 80° C. The solution was covered and placed in an oven at 70° C. for approximately 24 hours. The solution was then allowed to totally degas.

This solution was spun according to the following conditions. The degassed polymer solution, at a temperature of 60° C., was introduced into a conventional spinning apparatus using a 35 mil nozzle block. A degassed bore fluid, generally comprising water at a temperature of 22° C., was also delivered to the nozzle block. The hollow fiber was then spun into a gravity-fed bath with take-up rollers having a take-up speed of 6 ft/min, slightly lower than the spinning speed. The spun fiber dropped a distance of 12 inches from the nozzle into a water coagulation bath, where the membrane was formed. The fiber was then leached in a water bath at room temperature for 24 hours, and subsequently placed into a 25% glycerin/water bath for an additional 24 hours. After leaching, the fibers were dried in a 50° C. oven for two days. Tests were performed on the fibers, and the mechanical properties of the fibers constructed according to this process were recorded as follows.

Test Results:

I. INNER DIAMETER/OUTER DIAMETER CALCULATIONS

| SAMPLE | ID | OD |
|---|---|---|
| 1 | 30 | 59 |
| 2 | 28 | 50 |
| 3 | 30 | 52 |
| 4 | 31 | 50 |
| 5 | 28 | 49 |
| AVERAGE | 29.4 | 52.0 |

II. BURST PRESSURE

| SAMPLE | PSI |
|---|---|
| 1 | 325 |
| 2 | 350 |
| 3 | 390 |
| 4 | 350 |
| 5 | 385 |
| AVERAGE | 360 |

The entries recorded in the burst pressure summary were measured using a testing apparatus whereby the fibers were connected to a source of fluid. Fluid was then injected into the fibers and the fluid pressure was gradually increased until the fibers burst, at which point the pressure was recorded. By way of comparison, polysulfone hollow fiber membranes constructed in accordance with conventional methods possess burst pressures in the range of about 100 to 200 psi.

The fiber compression test was performed by placing the fiber on a rigid surface and incrementally applying a longitudinal pressure across the top surface thereof. At a point when the fiber no longer responded to the compressive forces being applied, the pressure of the forces was recorded.

IV. TENSILE STRENGTH (PSI)

| SAMPLE | LBf | TS, PSI |
|---|---|---|
| 1 | 0.38 | 263 |
| 2 | 0.34 | 235 |
| 3 | 0.38 | 263 |
| 4 | 0.36 | 249 |
| 5 | 0.33 | 229 |
| AVERAGE | 0.358 | 248 |

V. % ELONGATION

| SAMPLE | TO BREAK | % ELONGATION |
|---|---|---|
| 1 | 1.64 | 82.0 |
| 2 | 1.754 | 87.7 |
| 3 | 1.871 | 93.5 |
| 4 | 2.05 | 102.5 |
| 5 | 2.93 | 146.4 |
| AVERAGE | 2.0490 | 102.4 |

The elongation and tensile strength tests were performed by exerting essentially equal pressure on the opposed ends of a fiber to effectively pull the ends away from each other. When the fiber broke, the pressure then being applied was recorded. At the point immediately preceding the break, the length of the fiber was recorded, and the percent elongation over the original length of the fiber was recorded.

VI. AVERAGE SUMMARY

| | |
|---|---|
| Burst Pressure | 360 PSI |
| Compression at 1.5 KG | 33.57 MILS |
| % Original OD at 1.5 KG | 65% |
| Compression at 2.5 KG | 55.53 MILS |
| % Original OD at 2.5 KG | 107% |
| Tensile Strength | 248 PSI |
| % Elongation | 102.4% |

As can be seen from the above test results, PVDF based hollow fiber membranes manufactured according to the present invention possess excellent strength properties which are effective and desirable for use in a wide range of filtration applications.

III. FIBER COMPRESSION

| SAMPLE | 1 | 2 | 3 | 4 | 5 | AV (MM) | AV (MILS) | % ORIG OD |
|---|---|---|---|---|---|---|---|---|
| 0.5 KGf | 0.208 | 0.29 | 0.312 | 0.429 | 0.359 | 0.320 | 12.58 | 24 |
| 1.0 KGf | 0.419 | 0.539 | 0.552 | 0.678 | 0.599 | 0.557 | 21.94 | 42 |
| 1.5 KGf | 0.671 | 0.83 | 0.804 | 0.98 | 0.978 | 0.853 | 33.57 | 65 |
| 2.0 KGf | 0.931 | 1.229 | 1.198 | 1.332 | 1.299 | 1.198 | 47.16 | 91 |
| 2.5 KGf | 1.219 | 1.43 | 1.401 | 1.532 | 1.47 | 1.410 | 55.53 | 107 |

EXAMPLE 2

A polymer solution was formed as described in Example 1, but comprising 5% PVDF (MW=10,000 to 10,000,000), 10% polydiacetylene (MW=1,000 to 1,000,000) for the second polymer, 6% polyvinyl pyrilodone (PVP) (MW=1,000 to 1,000,000) as the pore forming agent, and 79% DMAC as the solvent. The mixing continued for 2 to 3 hours with the solution being maintained at a temperature of no greater than 60° C. The solution was covered and placed in an oven at 60° C. for approximately 24 hours, and was then allowed to totally degas. The spinning conditions were essentially as described in Example 1, except the temperature of the solution as it as being spun was 50° C. The bore fluid and the coagulation bath both comprised water and the solvent DMAC, wherein the DMAC was present in a quantity substantially less than 79%.

EXAMPLE 3

A polymer solution was formed under the same mixing conditions as in Example 1, but comprising 10% PVDF (MW=10,000 to 1,000,000), 15% polyvinyl alcohol (PVA) (MW=1,000 to 10,000,000) for the second polymer, 7.5% methylmethacrylate (MMA) for the pore forming agent, and 67.5% N-methyl pyrole (NMP) for the solvent. The hollow fiber membrane was spun using the methods and conditions as in Example 1, with the bore fluid and the coagulation bath both comprising a mixture of water and NMP. The percentage of solvent in both the bore fluid and the coagulation bath was substantially less than 67.5%.

EXAMPLE 4

A polymer solution was formed as in Example 1, but comprising a solution of 25% PVDF (MW=100,000 to 1,000,000), 15% polyhexafluoropropylene (PHFP) (MW=10,000 to 10,000,000) for the second polymer, 2% maleic anhydride for the pore forming agent, and 48% cyclohexane as the solvent. The bore fluid and the coagulation bath both comprised a mixture of water and cyclohexane, with the cyclohexane present in a percentage substantially less than 48%. The mixing and spinning conditions were essentially the same as those in the preceding examples.

EXAMPLE 5

A polymer solution was formed according to the description set forth in Example 1, and comprised 35% PVDF (MW=10,000 to 10,000,000), 1% polyvinyl alcohol (PVA) (MW=1,000 to 10,000,000), 0.5% lithium chloride, and 63.5% DMAC. The temperature during mixing was not allowed to exceed 60° C. The solution was then placed in an oven for 24 hours at a temperature of 60° C. The spinning conditions were essentially the same as set forth in Example 1, except the temperature of the solution as it was being spun was 50° C. The bore fluid and the coagulation bath comprised water and DMAC, the DMAC being present in an amount substantially less than 63.5%.

Clearly, polyvinylidene fluoride based hollow fiber membranes formed in accordance with the present invention possess excellent strength characteristics. In fact, prior to this invention, it was considered necessary to use PVDF membranes in combination with a backing or other support, as one skilled in the art would not have deemed a PVDF membrane capable of possessing sufficient strength to stand alone as is necessary for hollow fiber membranes. It is thought that this increased strength may be due, at least in part, to the controlled maximum temperatures to which the PVDF is subjected during processing, along with the addition of the pore forming agent which allows the solution to contain higher concentrations of PVDF. Furthermore, controlling the rate of the phase inversion by utilizing solvent in one or both of the bore fluid and the coagulation bath allows the use of a decreased amount of pore forming agent, also thought to contribute to the excellent strength achieved by the PVDF membranes of this invention. As discussed above, membranes formed from polymer melts have decreased porosity, due to the melting of the polymer which increases the density of the polymer which is ultimately spun. By contrast, membranes formed according to the method of this invention tend to have increased porosity, as the controlled temperatures prevent this densification.

An additional advantage of the membranes formed in accordance with this invention is the asymmetrical pore structure of the membranes, which results from the use of a polymer solution instead of a polymer melt as the fiber forming material. This asymmetrical pore structure facilitates a low transmembrane pressure drop, making the membrane perform more effectively than the prior art.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A semipermeable hollow fiber ultrafiltration membrane for liquid/liquid separation formed from a composition comprising an engineering thermoplastic resin, wherein the thermoplastic resin is polyvinylidene fluoride, a pore forming agent, and a solvent capable of solubilizing the polyvinylidene fluoride and the pore forming agent, the membrane having an asymmetrical pore structure to provide a low transmembrane pressure drop, a porosity in the range of about 25% to about 60%, and pore sizes in the range of from about 0.003 to about 1 micron in diameter, wherein the membrane is capable of functioning as a liquid/liquid ultrafiltration separation membrane absent further treatment.

2. The semipermeable hollow fiber membrane as set forth in claim 1, further comprising a second thermoplastic resin blended with the polyvinylidene fluoride, wherein the second resin is selected from the group consisting of polymethylmethacrylate, polyvinylformal, polyvinyl alcohol, polyhexafluoropropylene, polydiacetylene, cellulose and copolymers thereof.

3. The semipermeable hollow fiber ultrafiltration membrane as set forth in claim 1, wherein the composition comprises about 5% to about 48% by weight polyvinylidene fluoride, about 1% to about 25% by weight pore forming agent, and about 45% to about 80% by weight solvent.

4. The semipermeable hollow fiber ultrafiltration membrane as set forth in claim 1, wherein the membrane has a burst pressure in the range of about 325 psi to about 390 psi.

5. A semipermeable hollow fiber ultrafiltration membrane for liquid/liquid separation constructed in accordance with a method comprising the steps of:

a) preparing a fiber forming material by contacting and mixing an engineering thermoplastic resin, a pore forming agent, and a solvent capable of solubilizing the thermoplastic resin and the pore forming agent, at a temperature between about 4° and 80° C., to form a homogeneous solution, wherein the thermoplastic resin comprises polyvinylidene fluoride;

b) maintaining the solution at a temperature ranging from about 4° to about 80° C. during the mixing;

c) extruding the solution through a spinneret to form a hollow fiber; and d) removing the solvent and pore forming agent from the solution to form a semipermeable hollow fiber ultrafiltration membrane having an asymmetrical pore structure, the membrane having a porosity in the range of about 25% to about 60%, and pore sizes in the range of from about 0.003 to about 1 micron in diameter, and wherein the membrane is capable of functioning as a liquid/liquid ultrafiltration separation membrane absent further treatment.

6. The semipermeable hollow fiber membrane as set forth in claim 5, wherein the solution further comprises a second thermoplastic resin selected from the group consisting of polymethylmethacrylate, polyvinylformal, polyvinyl alcohol, polyhexafluoropropylene, polydiacetylene, cellulose, and copolymers thereof.

7. The semipermeable hollow fiber ultrafiltration membrane as set forth in claim 5, wherein the composition comprises about 5% to about 48% by weight polyvinylidene fluoride, about 1% to about 25% by weight pore forming agent, and about 45% to about 80% by weight solvent.

8. The semipermeable hollow fiber ultrafiltration membrane as set forth in claim 5, wherein the membrane has a burst pressure in the range of about 325 psi to about 390 psi.

* * * * *